United States Patent [19]

Pillischafske

[11] 3,829,824
[45] Aug. 13, 1974

[54] CLAMP BOLT FOR AN AUTOMOTIVE VEHICLE BATTERY

[76] Inventor: Edward L. Pillischafske, P.O. Box 965, Henderson, Nev. 89015

[22] Filed: May 18, 1973

[21] Appl. No.: 361,637

[52] U.S. Cl............... 339/230 C, 404/373, 404/48, 85/1
[51] Int. Cl............................................ H01r 11/26
[58] Field of Search ........... 339/230, 231, 232, 233, 339/234, 235, 236, 237; 404/373, 43, 44, 45, 46, 47, 48; 151/16; 85/1

[56] References Cited
UNITED STATES PATENTS 2,299,291  10/1942  Zam ............................... 339/230 C
2,531,307  11/1950  Thomas .......................... 339/230 C
2,618,675  11/1952  Lallmane ....................... 339/230 C

*Primary Examiner*—Paul R. Gilliam
*Assistant Examiner*—Robert A. Hafer

[57] ABSTRACT

A bolt device for securing a cable clamp to a battery, the device consisting primarily of a right hand threaded member and a left hand threaded member, one of the members having a shank for being received within an opening of the other threaded member, the arrangement receiving a transverse pin for securement to each other.

3 Claims, 3 Drawing Figures

PATENTED AUG 13 1974 3,829,824

CLAMP BOLT FOR AN AUTOMOTIVE VEHICLE BATTERY

This invention relates to battery cable clamps, and more particularly to an improved clamp bolt for an automotive vehicle battery.

It is therefore the principal purpose of this invention to provide a clamp bolt which will make it easier to connect or disconnect the battery cable clamp from the terminal post of the vehicle's battery.

Another object of this invention is to provide a clamp bolt which will have a body structure of two members, one having a left hand threaded member and the other having a right hand threaded member, the two members having transverse pin means for securing them together so as to form the bolt assembly.

Another object of this invention is to provide a bolt of the type described which one of the threaded members will have an opening for receiving the shank portion of the opposite threaded member so that the end surfaces of the connecting point will abut with each other.

Yet another object of this invention is to provide a bolt of the type described which will have slot means on the end faces so as to receive screw driver or other means for tightening or loosening the cable clamp on the battery terminal.

Other objects of the invention are to provide a clamp bolt which is simple in design, inexpensive to manufacture, rugged in construction, easy to use and efficient in operation.

Figure 1:
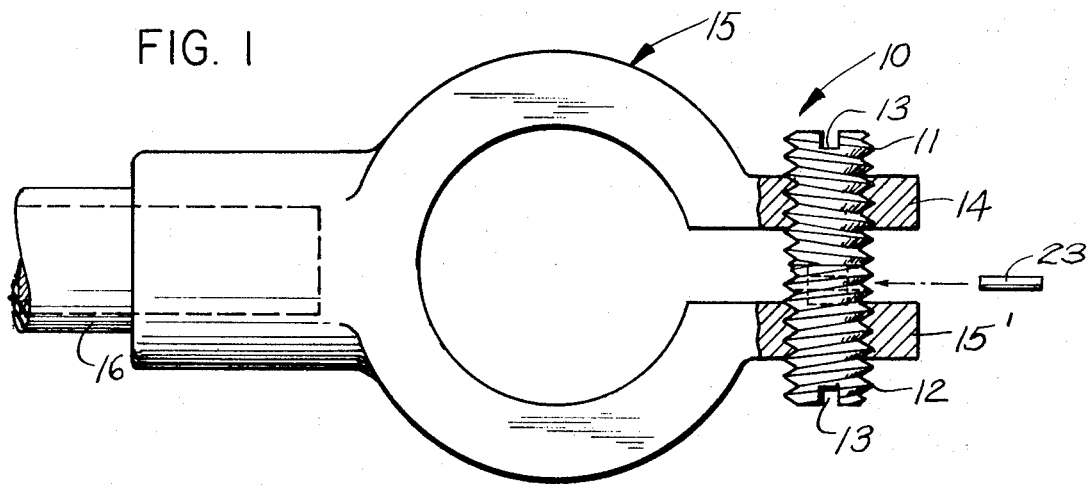
Figure 2:
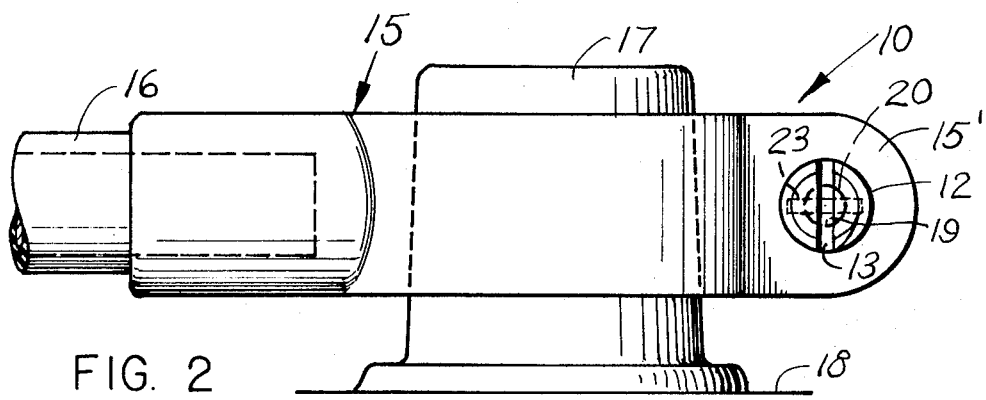
Figure 3:
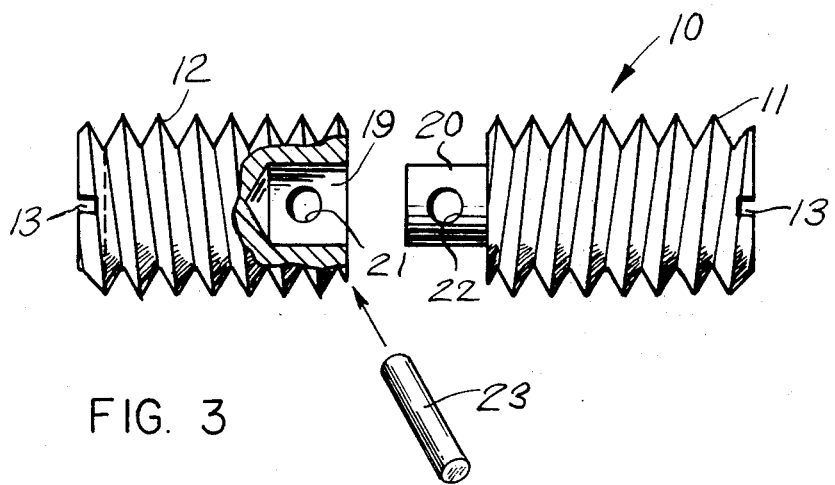

These and other objects will be readily evident upon a study of the following specification together with the accompanying drawing wherein:

FIG. 1 is a plan view of the battery cable clamp, showing the present invention installed therein, the clamp projections being shown broken away and the transverse pin shown removed therefrom for the sake of clarity;

FIG. 2 is a side view of the clamp and bolt, shown secured to the terminal post of a battery which is shown fragmentated and in elevation; and FIG. 3 is a horizontal view of the invention shown removed from the clamp and in elevation, the members being separated from each other, one of the threaded members being shown broken away to show the internal opening for receiving the shank portion of the opposite member.

According to this invention, a clamp bolt 10 is shown to include an externally and left hand threaded member 11 and a right hand threaded member 12, both of which have a slot 13 for the placement of a screw driver or other tool for tightening or loosening bolt 10.

Referring now more particularly to FIG. 1 of the drawing, it will be seen that the left hand threaded member 11 is threadably carried within the projection 14 of similar thread, of the clamp 15 having the battery cable 16. The right hand threaded member 12 is also appropriately received within the similar threaded projection 15' of clamp 15.

Referring now to FIG. 2 of the drawing, it will be seen that clamp 15 is carried upon the terminal 17 of battery 18 in a well known manner and again referring to FIG. 1 of the drawing, it will be seen that the members 11 and 12 are threaded into place within their respective projections 14 and 15' of clamp 15, the members 11 and 12 being aligned with each other so that the opening 19 of member 12 will receive the shank 20 of member 11, the opening 19 and the shank 20 being in longitudinal alignment of bolt 10. The opening 21 of member 12 is transversely therethrough so as to align with the transverse opening 22 of the shank 20 of member 11, the alignment enabling the pin 23 to be forced therein so as to enable the bolt 10 to be functional.

It will be noted that pin 23 is placed within the openings 21 and 22 of the respective members 11 and 12, after the members 11 and 12 have been threaded into the projections 14 and 15' respectively of clamp 15.

The clamp projections 14 and 15' are closed towards each other or opened away from each other, by the rotation of bolt 10 and will thus serve to eliminate possible faulty connections of cable 16 and its clamp 15 to battery 18 as is commonly found in structures of the prior art.

It shall be noted further that the structure 10 enables the user to tighten clamp 15 more firmly and enables the user to easily loosen the clamp 15 when desired to remove clamp 15 from the battery terminal 17.

What I now claim is:

1. A clamp bolt assembly for an automotive vehicle battery, comprising in combination, a generally U-shaped clamp for fitting around a battery terminal post, opposite ends of said clamp being parallel to each other with a space there between, each said end having a threaded opening therethrough and which along a same axis, one said opening having a left hand thread and the other said opening having a right hand thread, a pair of members threadingly engageable in said threaded openings, one said member accordingly having a left hand thread and the other having a right hand thread, facing ends of said members being engageable with each other, and pin means receiveable transversely through said members for securement of said members together.

2. The combination as set forth in claim 1, wherein one said member has on said facing ends a cylindrical opening along said axis, the other said member having on said facing end a cylindrical shank protruding therefrom along said axis, said shank of one said member being slideably receiveable within said opening of the other said member for effecting said engagement, said member having said axial opening having a transverse opening therethrough that passes transversely through said axial opening, said shank of the other said member having likewise a transverse opening therethrough, said transverse openings being adaptable to be aligned with each other when said members are fully engaged, and said pin means comprising a straight pin receiveable fully through said transverse openings of said members for effecting said securement, said members thus secured together being prevented from unscrewing from said clamp ends due to said left and right hand threads, and the opposite end faces of said members each having a transverse slot for engagement by a screw driver.

3. The combination as set forth in claim 2, wherein said space between said clamp ends is of sufficient width for allowing access for insertion or removal of said pin in or out of said transverse openings when said members are engaged.

* * * * *